Jan. 19, 1965
R. B. GOODRUM
3,166,336
ADJUSTABLE JAW KEYWAY
Filed Jan. 15, 1962
2 Sheets-Sheet 2
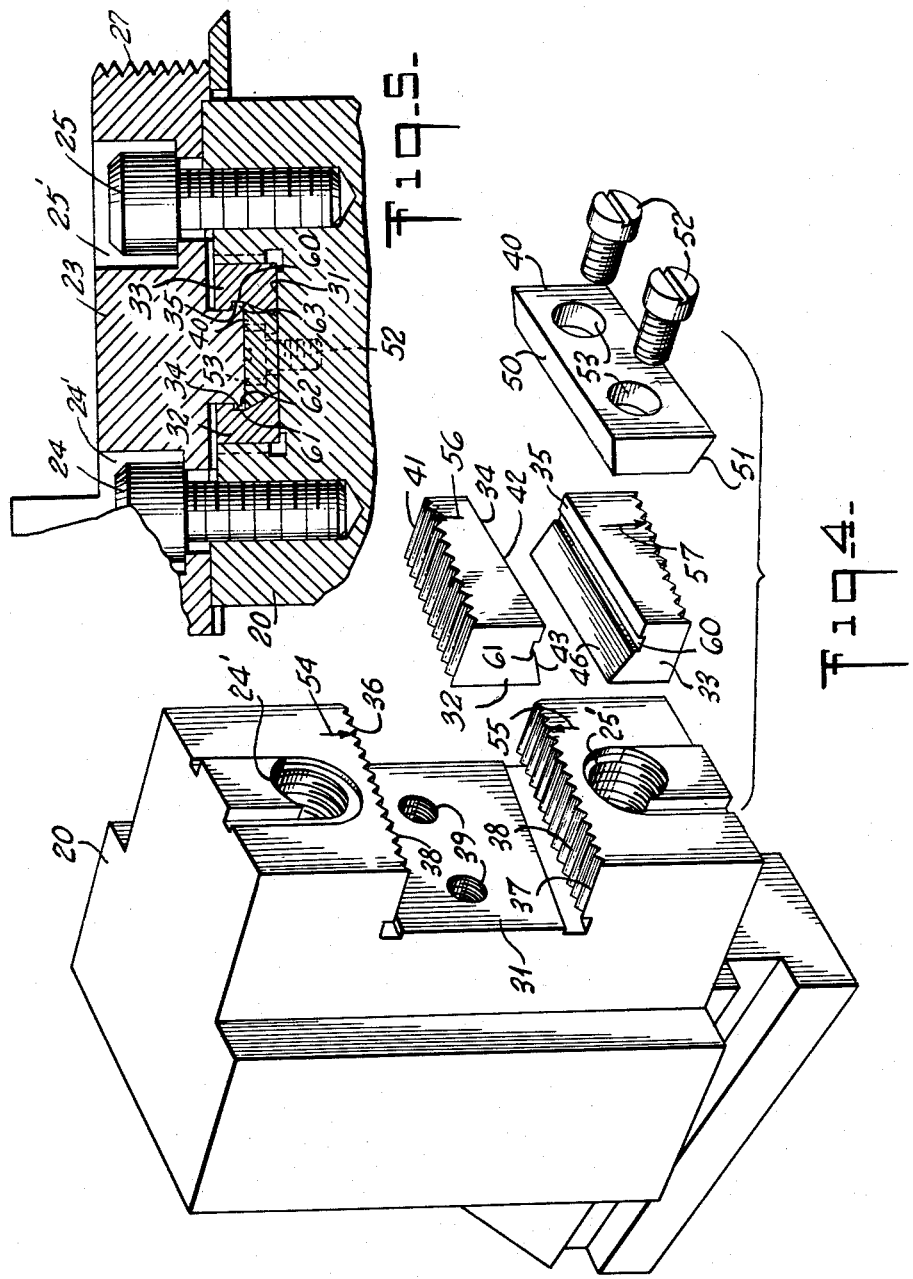
INVENTOR
RICHARD B. GOODRUM

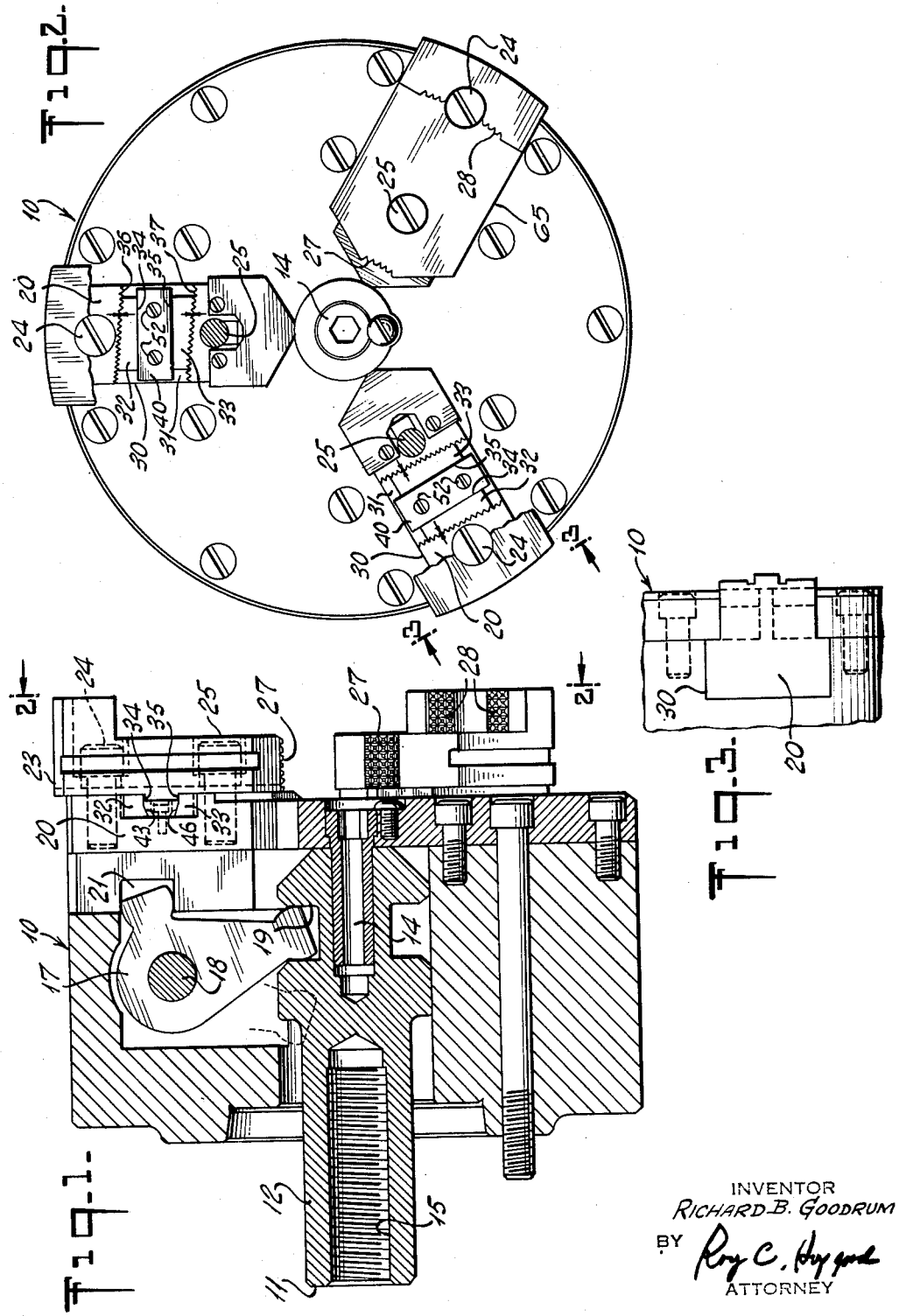

United States Patent Office 3,166,336
Patented Jan. 19, 1965

3,166,336
ADJUSTABLE JAW KEYWAY
Richard B. Goodrum, Kensington, Conn., assignor, by mesne assignments, to The Cushman Chuck Company, Hartford, Conn., a corporation of Connecticut
Filed Jan. 15, 1962, Ser. No. 166,347
13 Claims. (Cl. 279—123)

This invention relates to an adjustable jaw keyway used in connection with a power chuck and particularly concerns a novel mechanism for precisely compensating for wear in the chuck.

In the ordinary operation of a chuck, certain parts which move frequently are subject to wear causing the original accuracy of the chuck to be lost. In particular, the work-clamping jaws of a chuck and the keyways which guide their movement are particularly subject to wear. As a result of such wear and the loosening of the jaw fit in its keyway, the concentricity of such jaws about the chuck's center of rotation becomes inaccurate since the radial position of a jaw is changed.

Since the work object is held in position by a plurality of such jaws, a change in radial position of any jaw reduces the accuracy with which the chuck grips the work object. As a result, the operations performed on the work object will be inaccurate.

Therefore, a primary object of this invention is to provide means for precisely adjusting the radial position of each jaw so as to compensate for wear, or other inaccuracies.

A further object of this invention is to provide means for precisely adjusting the radial position of each jaw so as to compensate for wear or other inaccuracies by adjusting the radial position of a cross-keyway into which a top or false jaw is secured.

A still further object of this invention is to provide calibration means for accurately determining and controlling the adjustment of the radial position of the jaw.

Still another object of this invention is to provide a chuck fitted with a plurality of sets of work-engaging jaws which sets may be used selectively depending upon the size of the work object.

An important object of this invention is to provide means for simply but precisely adjusting the radial position of the jaws.

Briefly, my invention comprises a chuck having a master jaw with a cross-keyway in which the front jaw or false jaw is positioned. An angularly extending channel is formed in the master jaw and means are provided in the channel for forming the cross-keyway and for adjusting the radial position thereof. The adjusting means comprises serrated surfaces forming the channel walls, which serrated surfaces are positioned to make an acute angle with the direction of the radial keyway in which the jaw moves. Wedges are provided which fit within the channel and have outer complementary serrated side walls to mate with the serrated walls of the channel. These wedges define a space therebetween called the cross-keyway in which the front jaw is securely positioned. Calibration marks are provided on the master jaw and on the wedges, which marks are moved relative to one another when the position of the wedges is altered. By varying or alternating the position of the wedges, the radial position of the cross-keyway is caused to vary. In this manner, a precise adjustment of the radial position of the front jaw is provided.

Other objects and various further features of novelty and invention will become apparent or will occur to those skilled in the art from a reading of the following specification in conjunction with the accompanying drawings. In said drawings, which show, for illustrative purposes only, preferred forms of the invention:

FIG. 1 is an exial sectional view of a chuck showing only one jaw;

FIG. 2 is a broken away front sectional view of FIG. 1 showing three keyways and jaws, taken along the plane of 2—2 of FIG. 1 for the first jaw, and along other parallel planes showing the internal arrangement of parts for each of the jaws;

FIG. 3 is a fragmentary side view along the plane of 3—3 of FIG. 2 showing the jaw in its respective keyway;

FIG. 4 is an exploded perspective view of the master jaw and keyway mechanism of the previous figures; and FIG. 5 is a fragmentary view of FIG. 1 showing the clearances between various bolts and bolt holes in greatly enlarged scale.

Referring now to FIG. 1 there is shown a chuck 10 having a standard draw shank 11 having a front bore 14 and a back bore 15 to accommodate necessary screws and bolts. The front section of the chuck 10 includes the jaws which are coupled to the draw shank in a conventional manner. The movement of the jaws is actuated by a bell crank lever 17 which is fixedly pivoted at pin 18, the lower arm of which is received in the recess 19 of the draw shank. A master jaw 20 has a recess 21 to accommodate the other arm of lever 17. A conventional dust shield 65 is provided.

As shown in FIGS. 2 and 3, the master jaw rides in a radial keyway 30 in acordance with the rotation of bell crank lever 17.

Front jaw 23 comprises a plurality of laterally-offset jaw noses or work-gripping surfaces 27 and 28. It is understood that the other jaws moving in the other radial keyways have similar jaw noses. While only two of such jaw noses are shown, it is to be understood that other jaw noses may be provided so that a selected set of jaw noses may grip work objects of different diameters.

When observed in conjunction with FIG. 4, it will be seen that a channel 31 is provided in master jaw 20. Within channel 31 are positioned adjustable wedges 32 and 33. These wedges have straight, planar sections indicated by the numerals 34 and 35 which are perpendicular to the radial keyway 30. The region between surfaces 34 and 35 defines a cross-keyway the radial position of which may be varied.

Master jaw 20 includes walls 36 and 37 which define channel 31 and which are inclined or make an acute angle with respect to the direction of the radial keyway 30. A series of serrations 38 are formed in the surface of each of the inclined walls 36 and 37. The base of channel 31 is flat and includes bolt holes 39 to accommodate bolts 52 which are used to secure a locking wedge 40 in position.

Adjustable wedge 32 is a block having flat planar surfaces except at sides 41 and 42. Side 41 is inclined at the same acute angle as channel wall 36 and similarly has a plurality of serrations formed therein to mate with serrations 38. Side 42 of locking wedge 32 has an inclined or tapered surface 43 and a straight or planar section 34. Adjustable wedge 33 is similarly formed having a tapered surface 46 arranged at an angle to straight surface 35.

As shown in FIGS. 2 and 5, front jaw 23 is secured to master jaw 20 by means of bolts 24 and 25 which are received in bolt holes 24' and 25'. The bolt holes have the necessary clearance as shown by the exaggerated spaces 24', 25' (FIG. 5) to accommodate the relatively small but precise adjustment in radial position of the front jaw.

Locking wedge 40 has a trapezoidal cross section with inclined sides 50 and 51 which form the same angle and are adapted to complement inclined surfaces 43 and 46 of adjustable wedges 32 and 33. The height of wedge 40 is approximately that of surface 43. Bolts 52 are provided to fit in bolt holes 53 and 39 to secure locking wedge 40 in position.

Exaggerated clearance lines are shown in FIG. 5 between the bolts 52 and bolt holes 53 to accommodate the relatively small, effectively radial movement of locking wedge 40 resulting from the angular movement of wedge blocks 33 and 34.

The front jaw 23 is fitted into the cross-keyway and has lateral tongue elements 62 and 63 which fit into complementary shaped grooves 60 and 61 formed in the adjustable wedges (FIG. 5). The position of the cross-keyway therefore determines the radial position of the front jaws.

Mating marks 54 and 55 are provided in master jaw 20 by engraving or other means. Complementary mating marks 56 and 57 are formed in adjustable wedges 32 and 33. The serrations may be so formed as to constitute a radial change in position of the cross-keyway equal to 0.001" because of their pitch and angle on which they are cut. Preferably, only relatively few of such serrations will be used to effect the necessary adjustment. The mating marks and the serrations constitute the calibration means.

When the radial position of the front jaw is to be varied, it is only necessary to remove bolts 52 and locking wedge 40 and move adjustable wedges 32 and 33 a predetermined position to the right or to the left, relative to the initial mating marks. This movement will change the radial position of the cross-keyway.

Thus, there has been provided a simple means for precisely adjusting the radial position of the jaw so as to restore the original accuracy of the chuck.

I claim:

1. In a chuck having a plurality of radial keyways and work-clamping jaws respectively movable radially in said keyways, means for adjusting the radial position of a jaw comprising adjusting means having a wall disposed at an acute angle relative to a direction of movement of said jaws,
   said adjusting means being movable in a direction parallel to said wall and to control the relative position of a said jaw in a said respective keyway,
   and means cooperating with said adjusting means to adjustably secure said adjusting means in fixed position along said direction of movement,
   and calibration means on said adjusting means to precisely determine the degree of movement.

2. In a chuck having a plurality of radially movable work-clamping jaws,
   means for adjusting the radial position of a jaw to thereby compensate for wear and restore the accuracy of said chuck comprising
   an angularly extending cross keyway in said chuck guide means in which one of said work-clamping jaw means is fitted,
   and adjusting means to adjustably vary the radial position of said adjusting means including said cross keyway means to hold said work clamping jaw thereto.

3. In the chuck of claim 2,
   in which said cross keyway is defined by wedges,
   which wedges are movable at an acute angle relative to said cross keyway.

4. In a chuck having a radial keyway,
   a master jaw movable radially in said keyway,
   a channel in said master jaw having opposite side walls extending in a first direction at an acute angle to the radial direction,
   wedge means having a cross-keyway extending in a direction at right angles to said radial direction, said wedge means having
   outer side walls extending parallel to said side walls of said channel
   said wedge means having dimensions to fit within said channel so that the said respective side walls contact each other,
   said wedge means being movable along said first direction,
   means to adjustably secure said wedge means in position along said first direction,
   and front jaw means secured in said cross keyway.

5. In a chuck having a radial keyway,
   a master jaw movable radially in said keyway,
   a channel in said master jaw having opposite side walls extending in a first direction at an acute angle to the radial direction,
   wedge means having a cross-keyway extending in a direction at right angles to said radial direction, said wedge means having
   outer side walls extending parallel to said side walls of said channel,
   said wedge means having dimensions to fit within said channel so that the said respective side walls contact each other,
   said wedge means being movable along said first direction,
   means to adjustably secure said wedge means in position along said first direction,
   front jaw means secured in said cross keyway,
   and calibration means on said master jaw and said wedge means to precisely determine the degree of radial movement of said cross keyway.

6. In the chuck of claim 5, said calibration means including a plurality of complementary serrations in each of said side walls and indicia means on said master jaw and wedge means.

7. In the chuck of claim 6, in which each serration accounts for a movement in radial position of said front jaw of 0.001".

8. In the chuck of claim 5, front jaw means having a plurality of sets of offset jaw-gripping surfaces to grip work objects of different sizes.

9. In a chuck having a radial keyway,
   a master jaw movable radially in said keyway,
   a channel in said master jaw having opposite side walls extending in a first direction at an acute angle to the radial direction,
   wedge means having a cross-keyway extending in a direction at right angles to said radial direction, said wedge means having
   outer side walls extending parallel to said side walls of said channel,
   said wedge means having dimensions to fit within said channel so that the said respective side walls contact each other,
   said wedge means being movable along said first direction,
   means to adjustably secure said wedge means in position along said first direction,
   front jaw means secured in said cross-keyway
   said wedge means comprising
   first and second adjustable separate wedge blocks having first side walls extending in said first direction and having opposite side walls extending in a direction at right angles to said radial direction,
   said opposite side walls having tapered surfaces,
   a locking wedge to detachably interfit between said opposite side walls and having tapered sides to conform to the tapered surfaces of said side walls,
   and said front jaw means having tongue means to fit in said cross-keyway.

10. In the chuck of claim 2, front jaw means having a plurality of sets of offset jaw-gripping surfaces to grip work objects of different sizes.

11. In the chuck of claim 9,
    said master jaw and front jaw having aligned bolt holes therein, the bolt holes in said front jaw having sufficient clearance with respect to associated bolts passing therethrough as to allow corrective radial movement of said front jaw relative to said master jaw,
    said locking wedge and said master jaw having aligned bolt holes therein, the bolt holes in said locking wedge having sufficient clearance with respect to associated bolts passing therethrough as to allow corrective radial movement of said locking wedge relative to said master jaw.

12. In a chuck, the combination of
a master jaw
a front jaw,
means for moving said master jaw radially,
said master jaw having a channel extending at an oblique angle to the direction of radial movement,
adjusting means within said channel and movable along said channel and having securing means for gripping said front jaw,
said securing means including means extending perpendicular to said radial direction and being effectively movable in the radial direction upon movement of said adjusting means,
said adjusting means and said jaws having locking means for locking said adjusting means in a predetermined position along said channel.

13. In the chuck of claim 12, said adjusting means having calibration means including predetermined cooperable serrations formed in walls thereof cooperable with complementary serrations formed in the channel walls, and indicia means to determine the relative position of said serrations.

References Cited in the file of this patent

UNITED STATES PATENTS

| | | |
|---|---|---|
| 1,372,726 | Sloan | Mar. 29, 1921 |
| 2,687,308 | Highberg | Aug. 24, 1954 |
| 2,777,704 | Sloan | Jan. 15, 1957 |
| 2,917,314 | Ponting | Dec. 15, 1959 |